(12) United States Patent
Caton et al.

(10) Patent No.: US 6,961,133 B2
(45) Date of Patent: Nov. 1, 2005

(54) METHOD AND APPARATUS FOR NON-CONTACT THICKNESS MEASUREMENT

(75) Inventors: Lindsey M. Caton, Shoreline, WA (US); Edward G. Sergoyan, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 14 days.

(21) Appl. No.: 10/652,353

(22) Filed: Aug. 29, 2003

(65) Prior Publication Data

US 2005/0046874 A1 Mar. 3, 2005

(51) Int. Cl.[7] ........................ G01B 11/28; G01R 33/12
(52) U.S. Cl. ..................... 356/630; 324/752; 324/230
(58) Field of Search .................. 356/630; 324/752, 324/756, 230, 229; 73/597; 118/712, 664–665

(56) References Cited

U.S. PATENT DOCUMENTS

| | | | | |
|---|---|---|---|---|
| 4,849,694 A | * | 7/1989 | Coates | 324/230 |
| 4,977,853 A | * | 12/1990 | Falcoff et al. | 118/665 |
| 5,001,356 A | | 3/1991 | Ichikawa | |
| 5,062,298 A | * | 11/1991 | Falcoff et al. | 73/597 |
| 5,525,903 A | * | 6/1996 | Mandl et al. | 324/230 |
| 5,781,008 A | * | 7/1998 | Muller et al. | 324/230 |
| 5,964,298 A | | 10/1999 | Greenspun | |
| 6,120,833 A | | 9/2000 | Bonnebat et al. | |
| 6,453,227 B1 | | 9/2002 | Kalafut et al. | |
| 6,608,495 B2 | * | 8/2003 | Sarfaty et al. | 324/752 |

FOREIGN PATENT DOCUMENTS

| | | | | |
|---|---|---|---|---|
| EP | 402527 A2 | * | 12/1990 | G01B/7/10 |
| GB | 221 785 A | | 1/1925 | |
| JP | 0302710 A | * | 9/1991 | G01B/21/08 |

OTHER PUBLICATIONS

PCT/US2004/028028. International Search Report. Apr. 1, 2005.

* cited by examiner

*Primary Examiner*—Gregory J. Toatley, Jr.
*Assistant Examiner*—Sang H. Nguyen
(74) *Attorney, Agent, or Firm*—Thomas F. Lebens; Fitch, Even, Tabin & Flannery

(57) ABSTRACT

The present invention provides a method and apparatus for use in measuring a thickness of a layer and/or variations in layer thickness for layers that are flat, curved or have curves. The apparatus comprises a light source to generate a light beam, a light beam detector to detect at least a portion of the light beam reflected, an eddy current field generator that induces an eddy current, an eddy current detector to detect the induced eddy current and a processor coupled with the light source, light detector, eddy current field generator and eddy current detector, wherein the processor controls the light detector, eddy current field generator and eddy current detector. A radial characteristic of a region of the surface can be determined, a scaling factor can be determined based on the radial characteristic and a measured distance can be scaled based on the scaling factor in determining a thickness.

17 Claims, 9 Drawing Sheets

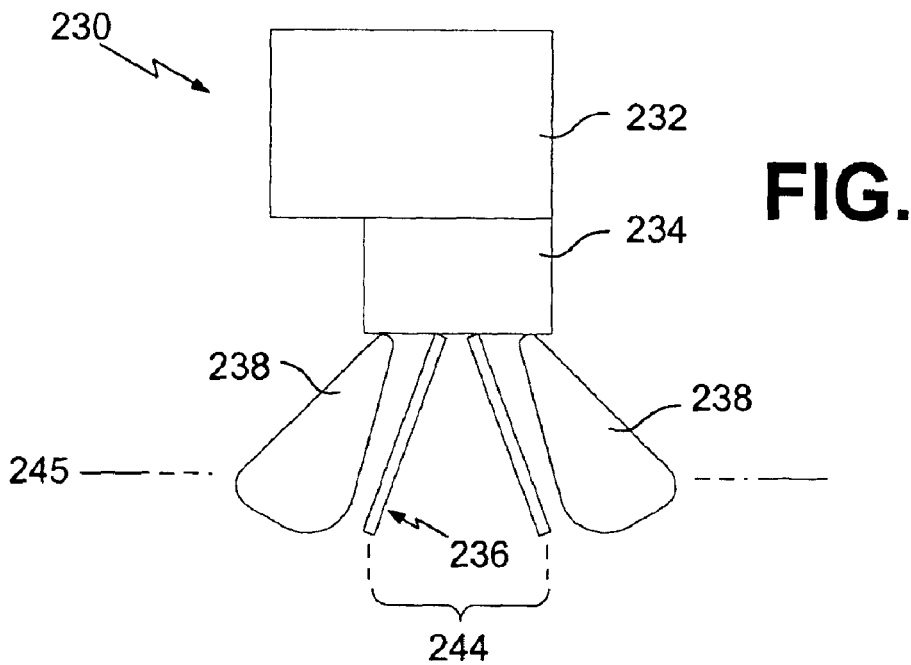
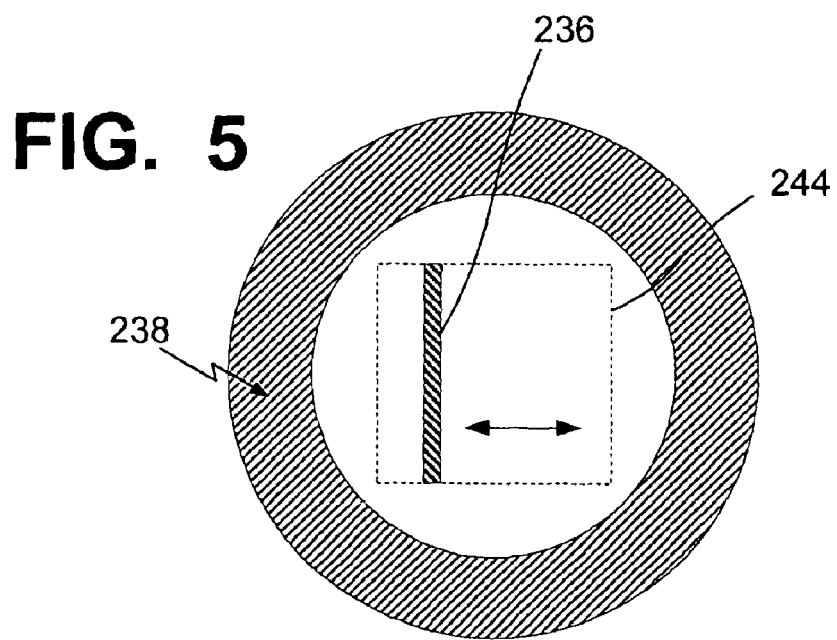

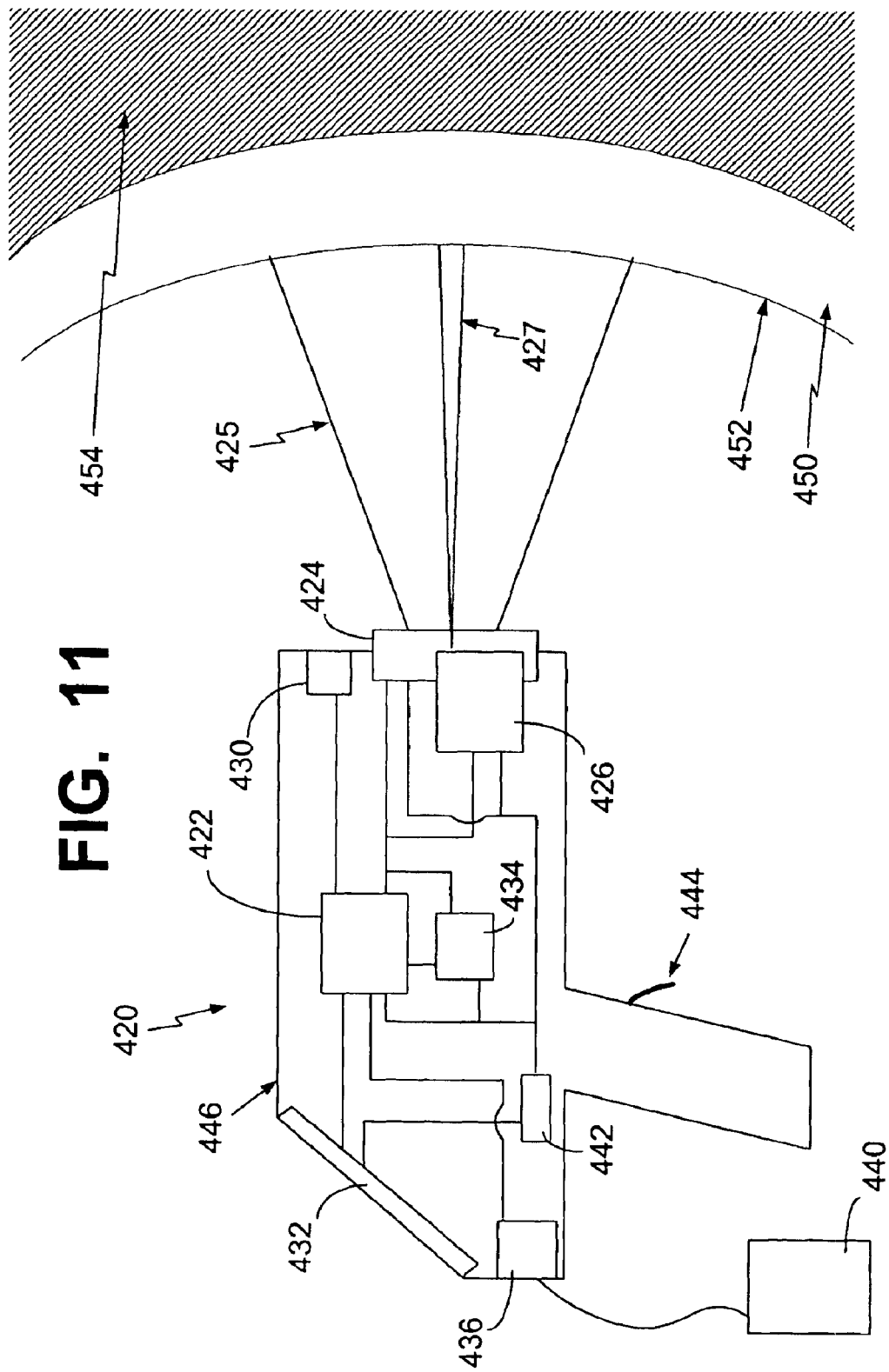

METHOD AND APPARATUS FOR NON-CONTACT THICKNESS MEASUREMENT

BACKGROUND OF THE INVENTION

The present invention relates generally to non-contact thickness measurements, and more particularly to non-contact layer thickness measurements and layer thickness variations.

It is sometimes advantageous to measure a thickness of a wet film or layer. For example, when applying paint to a surface it can be advantageous to know the thickness of the paint. Previously, the thickness was not measured until the paint was dry. This way the paint was not damaged or blemished. Waiting for paint to dry in order to measure the thickness of the paint layer can result in excessively long delays and be extremely costly. Some of the equipment for painting, operators of the equipment and parts of the facility in which a product is painted may be idle during this waiting period.

In some instances, the paint is measured when the paint is wet. These previous techniques required the wet paint to be touched. For example, a shim or other similar structure can be inserted into the wet paint to determine the paint layer thickness. This test is not very reliable. Further, the shim damages the paint surface which has to be repaired.

SUMMARY OF THE INVENTION

The present invention advantageously addresses the needs above as well as other needs by providing an apparatus, system and method for use in determining a thickness of a layer and/or a change in a layer thickness.

In one embodiment, the apparatus for use in measuring a thickness of a layer, comprising a light source configured to generate a light beam; a light beam detector configured to detect at least a portion of the light beam reflected; an eddy current field generator configured to induce an eddy current; an eddy current detector configured to detect the induced eddy current; and a processor coupled with the light source, the light detector, the eddy current field generator and the eddy current detector, wherein the processor is configured to control the light detector, the eddy current field generator and the eddy current detector.

In some embodiments, the apparatus further comprises a proximity sensor configured to detect a proximity to the first surface. The proximity sensor can be implemented through a non-contact tripod proximity sensor.

In some embodiments, the apparatus further comprising a proximity sensor configure to detect a proximity to the first surface. The proximity sensor can be implemented through a non-contact tripod proximity sensor.

In another embodiment, the invention can be characterized as a method for use in measuring a film thickness and/or variation in thickness. The method comprises the steps of inducing an eddy current in a substrate; detecting the induced eddy current; determining a first distance based on the eddy current; transmitting a light beam to impinge on a surface of a layer; detecting at least a portion of the light beam reflected from the layer; determining a second distance to the surface of the layer; and determining a first thickness of the layer based on the second distance to the surface and the first distance to the induced eddy current.

In some embodiments, the present invention provides an apparatus for use in measuring a thickness, comprising means for inducing an eddy current; means for detecting the induced eddy current; means for determining a first distance to the induced eddy current; means for generating a laser; means for detecting at least a portion of the laser reflected from a surface of a layer; means for determining a second distance to the surface without contacting the surface; and means for determining a thickness of the layer utilizing the first distance and the second distance.

A better understanding of the features and advantages of the present invention will be obtained by reference to the following detailed description of the invention and accompanying drawings, which set forth illustrative embodiments in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 4 depicts a simplified block diagram of an apparatus for measuring a thickness, depth or other similar measurements according to one variation of the apparatus of FIGS. 1 and 2;

FIG. 5 depicts a cross-sectional view of the eddy current field and a region scanned by a laser of the apparatus of FIG. 4 at an axis labeled in FIG. 4;

FIG. 11 depicts a simplified block diagram of a handheld measurement apparatus according to a further variation of the apparatus of FIGS. 1 and 2.

Corresponding reference characters indicate corresponding components throughout the several views of the drawings.

DETAILED DESCRIPTION OF THE PREFERRED EMBODIMENTS

Figure 1:
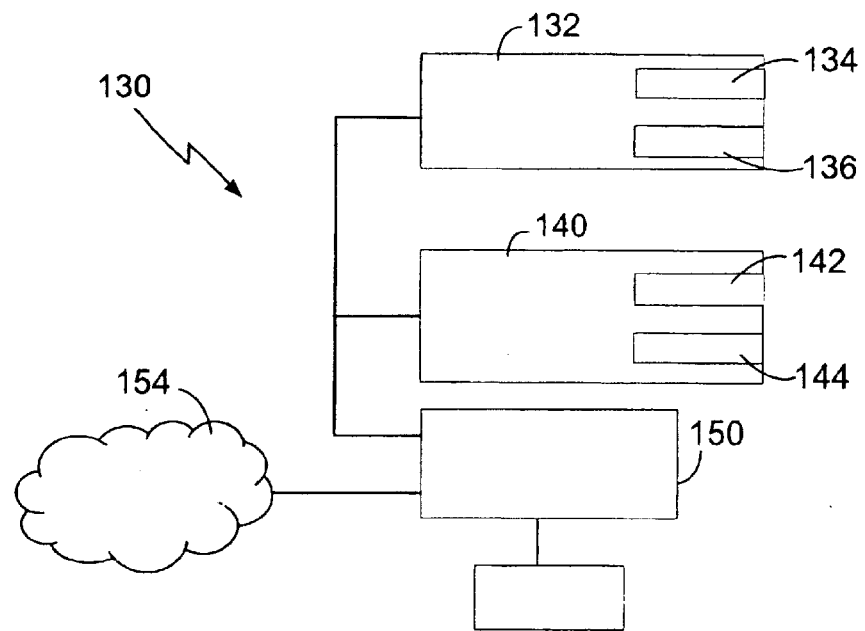
FIG. 1 depicts a simplified block diagram of an apparatus for performing non-contact thickness measurements according to one embodiment of the present invention.

The following description of the presently contemplated best mode of practicing the invention is not to be taken in a limiting sense, but is made merely for the purpose of describing the general principles of the invention. The scope of the invention should be determined with reference to the claims.

The present invention provides a method and apparatus for measuring the thickness of layers or films on a substrate. The present method and apparatus additionally are capable of measuring recesses in a layer (e.g., scratches, grooves, etc.) and/or layer thickness variations. Further, the present invention further provides for a method and apparatus to determine the thickness, depth and/or variation of a layer without having to contact the layer. For example, the present invention can measure the thickness of a layer while the layer is still wet. As such, the thickness of the layer can be determined without causing damage to the layer or putting blemishes in the layer. The present invention can be utilized in substantially any industry, such as automotive, aerospace, semiconductor, textile, manufacturing industries and the like, to provide improved product consistency, verification of product quality and significantly reduce costs of manufacture.

For example, in the aerospace and/or automotive industries, the present method and apparatus can accurately measure the thickness of paint primer, paint, insulating layers, fire retardant layers and other similar layers. Further, the present invention can measure the thickness of these layers while the layers are still wet.

In some applications it is very beneficial to apply a coat of paint while a primer paint is still wet. For example, it can take three to four hours for primer to dry on an airplane sufficiently so that the thickness of the primer can be measured with previous measurement devices. The measurement is necessary to ensure that the primer is sufficiently thick for corrosion resistance, but not so thick as to add excess weight to the airplane and affect fuel efficiency, which can result in increased operating fees (e.g., increased airport fees). Too much paint impacts fuel efficiency since the weight of paint per aircraft can be more than 500 pounds.

In previous techniques for measuring primer and/or paint thickness, a plastic shim is dipped into the wet primer paint after a predefined drying time (e.g., two hours) to provide a visual measurement. This shim dipping technique is not reliable for proper quality assurance (QA) evaluation. Further, this technique is not repeatable, and it leaves damaging marks on the surface that require repair.

However, waiting for the primer or paint to dry sufficiently to use other methods of measuring the layer to determine thickness, such as using an eddy current sensor in contact with the dry paint, results in a process delay of three, four or more hours. The plastic shim and wait cycle is repeated for application of each coat of paint over the primer or other coats of paint adding further delay.

The measurement of the paint primer or paint layer is preferably made within 0.5 hours from application since top coat can be applied over wet primer without any deterioration, and typically produces better adhesion. In applying paint to an aircraft, strict guidelines typically must be followed. As such, the shim test method is performed in about 90 locations over the aircraft. Once an accurate thickness is verified, a top coat or additional paint layers can be applied over the primer or other paint layers once the shim marks are repaired.

In performing the shim and wait cycle, or waiting the three or more hours for the paint to dry, the paint hanger is idle and often the painting crew is idle or performing non-value added work. The wasted resources and cost of the idle hange time and/or painting crew time is exceedingly high.

As such, the present method and apparatus can accurately measure the thickness of the paint and other layers or films while the paint or layer is still wet. This measurement can be taken within seconds or minutes of applying the paint. As such, the next layer of paint can be applied within the preferred 0.5 hours. Because the present invention can measure the thickness without touching the surface, no damaging marks are made and no touch-up work is required. This reduces the man hours of painting and reduces the cost of material. The reduced man hours additionally equals a reduction in the time need to occupy the paint hanger. Therefore, the present invention significantly reduces the paint cycle time, the idle hanger time, idle man hour time and total man hour time per aircraft, and also reduces the cost of materials.

FIG. 1 depicts a simplified block diagram of an apparatus 130 for performing non-contact thickness measurements according to one embodiment of the present invention. The apparatus includes an eddy current field device 132. The eddy current device includes an eddy current field generator 134 that generates and fluctuates and/or alternates a generated electromagnetic field. The eddy current device 132 additionally includes an eddy current sensor 136. The eddy current sensor senses an eddy current and current fluctuations generated within an object or substrate positioned close enough to the eddy current field generator 134 to be influenced by the electromagnetic field generated. In detecting the eddy current, the eddy current device 132 determines a distance to the eddy current. As such, the eddy current device determines a distance between the apparatus 130 and a substrate upon which the layer being measured is applied. The substrate can be substantially any material in which an eddy current can be generated such as a metallic or composite material and other similar materials that are at least semi-conductive.

The apparatus 130 additionally includes a light or laser source 140. The laser source includes one or more laser generators 142 and light or laser detector 144. The laser generator(s) generates one or more laser to reflect off of a surface being measured and is detected by the detector 144. The reflective surface can be substantially any surface that is reflective to the laser or light employed. Typically, when testing paint thicknesses, the reflective surface is non-translucent. The laser generator 142 can be configured to generate substantially any laser at substantially any wavelength. In one embodiment, the laser source is a triangulation laser source. The detector 144 can be substantially any laser detector, such as a charged coupled device (CCD) or other detectors. In one embodiment, the laser source 140 is implemented through a triangulation laser system. Further, the eddy current device 132 and/or laser source can be tuned or calibrated for accurate measurements based on the layer and substrate being measured, as described more fully below.

The eddy current device 132 and the laser source 140 both couple with a signal processor 150. The signal processor processes data from each of the eddy current device and the laser source. The processor determines the thickness of a layer over a conductive substrate; the thickness of the portion of the object being measured; the depth of a groove, scratch, dimple, crevice or other surface non-uniformity; and other similar measurements based on the eddy current measurements and the laser measurements. Typically, the eddy current device 132 and the laser source 140 are zeroed. In one embodiment, the apparatus utilizes an offset. If the apparatus 130 is configured such that the eddy current device 132 is offset a distance from the laser source, the processor utilizes this offset to zero the eddy current device, laser source or the calculation of the difference between measurements determined by the eddy current device and laser source to obtain an accurate layer thickness.

The processor 150 can be implemented through substantially any processor device capable of performing the desired signal processing, such as a micro-processor, a computer, central processing unit (CPU), a personal digital assistant (PDA), a summing device and other similar processing devices. In some embodiments the processor couples to an external computer, system, network and/or data storage 154. This allows the processor to receive additional information for further processing and control, access additional data, store data and forward data to external systems.

Figure 2:
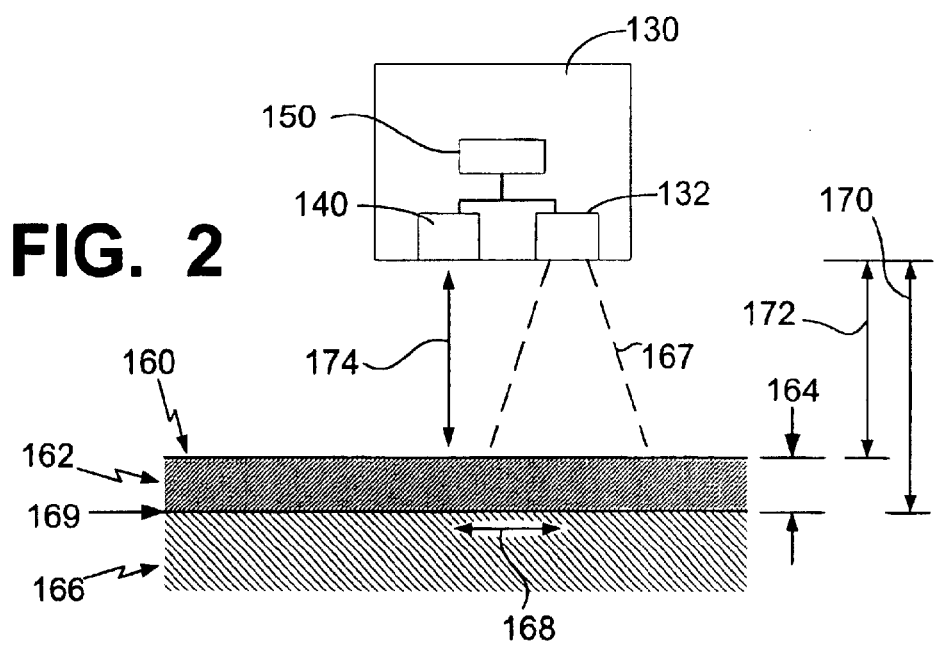
FIG. 2 depicts a simplified block diagram of the apparatus of FIG. 1 positioned near a surface of a layer, where a thickness of the layer is to be measured.

FIG. 2 depicts a simplified block diagram of the apparatus 130 positioned near a surface 160 of a layer 162, where a thickness 164 of the layer 162 is to be measured. The layer 162 adheres to or is fixed to an electrically conductive substrate 166.

Referring to FIGS. 1 and 2, in some embodiments, during operation, the eddy current field generator 134 generates and fluctuates an electromagnetic field 167. This electromagnetic field induces an eddy current 168 along a surface 169 of the electrically conductive substrate material 166. The eddy current sensor 136 detects the eddy current and/or fluctuation of current within the substrate and determines a distance 170 between the sensor 136 and the substrate surface 169. In one embodiment, the distance 170 is determined and/or calculated through the signal processor 150. Alternatively, the distance can be determined through the eddy current device 132 or an internal processor within the eddy current device.

The laser source 140 generates one or more lasers 174 to impinge on the surface 160 of the layer 162. The laser(s) reflect back to the laser source 140 where the distance 172 between the surface 160 and the apparatus is determined. In one embodiment, the distance 172 between the layer surface 160 and the laser source 140 is determined and/or calculated through the signal processor 150. Alternatively, the distance 172 can be determined through the laser source 140 and/or an internal processor within the laser source.

The signal processor 150 determines the thickness 164 of the layer 162 according to the difference between the substrate surface distance 172 and the layer surface distance 174 (and any offset and/or zeroing). As such, it can be seen that the present invention can accurately determine the thickness of the layer 162 without contacting the layer. Thus, the present invention can measure the thickness 164 of the layer even if the layer is wet, without disrupting or blemishing the layer 162 or surface 160 of the layer.

In one embodiment, the eddy current device 132 forwards an analog signal to the processor 150 representative of the distance to the substrate surface 169. Similarly, the laser source 140 forwards an analog signal to the processor representative of the distance 172 to the layer surface 160. The processor subtracts the two signals to obtain a resultant signal representative of the layer thickness 164. The processor then generates an output indicating the thickness 164. Alternatively, the eddy current device and laser source can covert the measured distances to digital values that are forwarded to the processor for further processing.

Figure 3:
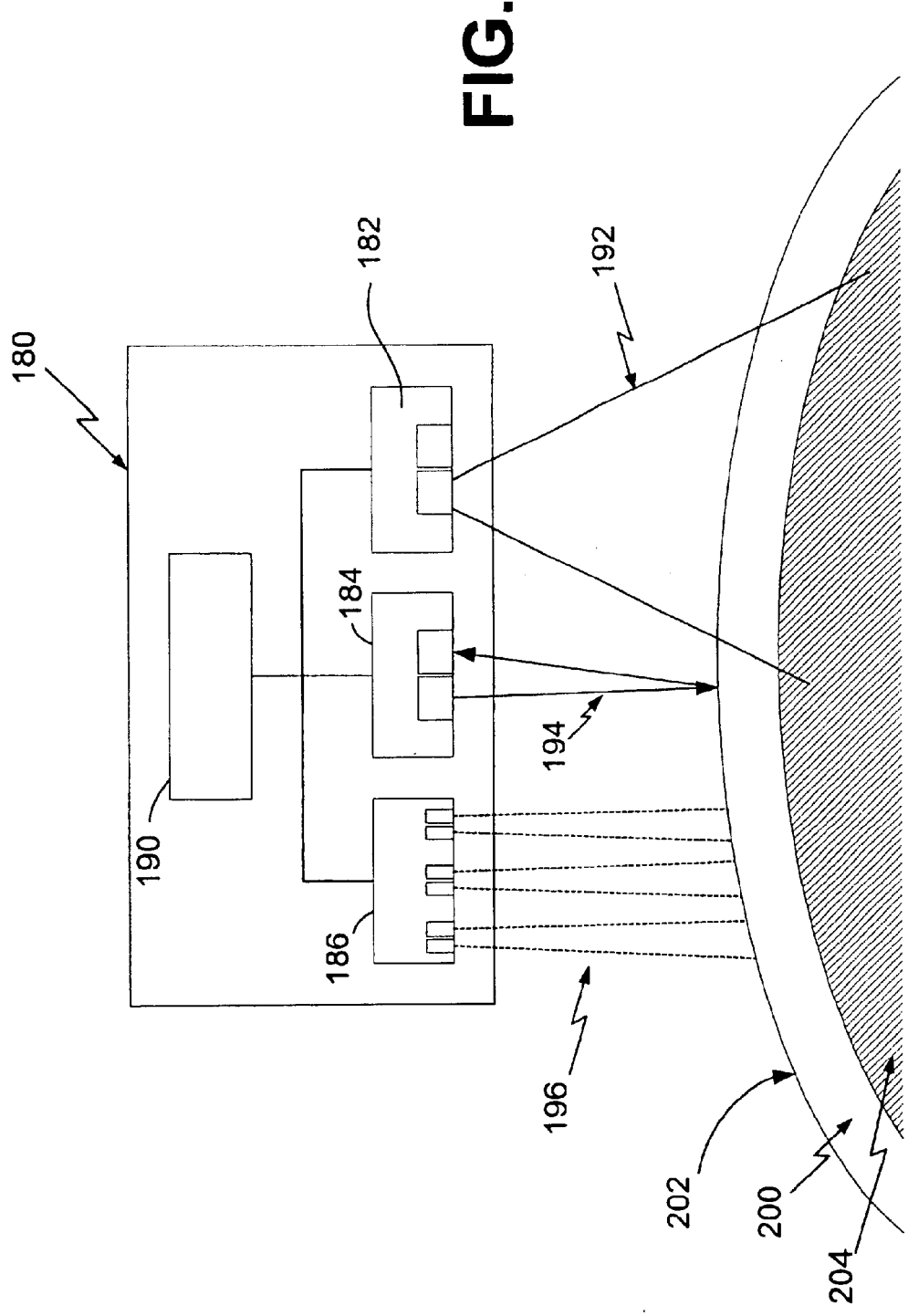
FIG. 3 depicts a simplified block diagram of an apparatus according to one variation of the apparatus of FIGS. 1 and 2 for determining a thickness of a layer.

FIG. 3 depicts a simplified block diagram of an apparatus 180 for determining a thickness of a layer 200, where the layer surface can be flat or curved. The apparatus includes an eddy current device 182, a laser source 184, a proximity sensor 186 and signal processor 190. The eddy current device 182 generates an eddy current field 192. The laser source generates one or more distance measuring lasers 194.

The proximity sensor 186 determines the general location of the apparatus 180 relative to the layer 200 and substrate 204. In one embodiment, the proximity sensor generates one or more lasers 196 that are utilized to triangulate the location of the apparatus relative to the surface 202. Further, the proximity sensor 186 can determine if the apparatus, and thus the eddy current device 182 and laser source 184, is normal to the surface 202 of the layer 200.

The proximity sensor 186 is typically configured to continuously determine the proximity of the apparatus 180 to the surface 202 allowing an operator to maintain the apparatus at normal to the surface while determining the distances to the substrate surface and the layer surface. In one embodiment, the proximity sensor 186 is a non-contact triangulation tripod. The triangulation tripod can be implemented, for example with a non-contact triangulation tripod distributed by Kaman Instrumentation of Bloomfield, Conn.

FIG. 4 depicts a simplified block diagram of an apparatus 230 for measuring a thickness of a layer on a substrate, the depth of a scratch or other similar measurements according to one embodiment of the present invention. The apparatus 230 includes a laser source/detector 232 that projects one or more lasers 236 onto a surface and detects the laser light reflected from the surface. The apparatus 230 additionally includes an eddy current generator/detector 234. The eddy current device 234 generates an eddy current field 238. In one embodiment, the eddy current device 234 is positioned in front of or closer to the surface to be measured allowing the eddy current field 238 to induce an eddy current in the substrate.

Typically, the size or diameter of the area of the substrate that is affected by the eddy current field 238 is several times the size or diameter of the area of the eddy current generator and/or sensor. For example, an eddy current sensor/generator that has a 2 inch diameter is capable of measuring approximately 5 inches in diameter. The large measurement diameter allows the measurement apparatus 230 to be operated at a distance from the layer being measured.

The laser source 232 can be configured to sweep the laser 236 over a region 244. Typically, the eddy current device 234 is configured to generate the eddy current field 238 proximate the laser 236. In one embodiment, the eddy current device generates the eddy current field such that the field at least partially surrounds the region 244 scanned or swept by the laser 236.

FIG. 5 depicts a cross-sectional view of the eddy current field 238 and the region 244 scanned by the laser 236 at the axis labeled 245 in FIG. 4. In this embodiment, the eddy current field 238 forms a generally tubular or donut shaped field about the scanned region 244. The laser 236 is swept across the region 244 allowing distance measurements to be taken at any point across the region. A distance determined at an angle normal to the surface is preferably utilized by the processor to determine the layer thickness. However, the distance can be an average distance, or a plurality of distances can be used.

Similarly, a measured distance to an eddy current at about normal to the apparatus and substrate surface is preferably used in calculating the layer thickness or recess depth. However, the eddy current generated within a substrate affected by the eddy current field 238 can be averaged over the area of the donut shape field, or a plurality of eddy current measurements can be taken and utilized with distances measured by points within the scanned region 244.

The present invention is capable of determining the thickness of a layer, depth of a recess or other similar measurements regardless of whether the substrate (and thus the layer) is flat or curved. As shown above in FIG. 2, the present invention generates an eddy current field near a region where the laser impinges the surface or is scanned across a region of the surface. The eddy current 168 is detected to define a distance from the apparatus 130 to the substrate surface 169. However, when measuring an eddy current on a curved surface, the resulting distance measured to the induced eddy current is typically an averaged distance which appears to be below the substrate surface 169 for a convex curve and above the surface for a concaved surface.

Figure 6:
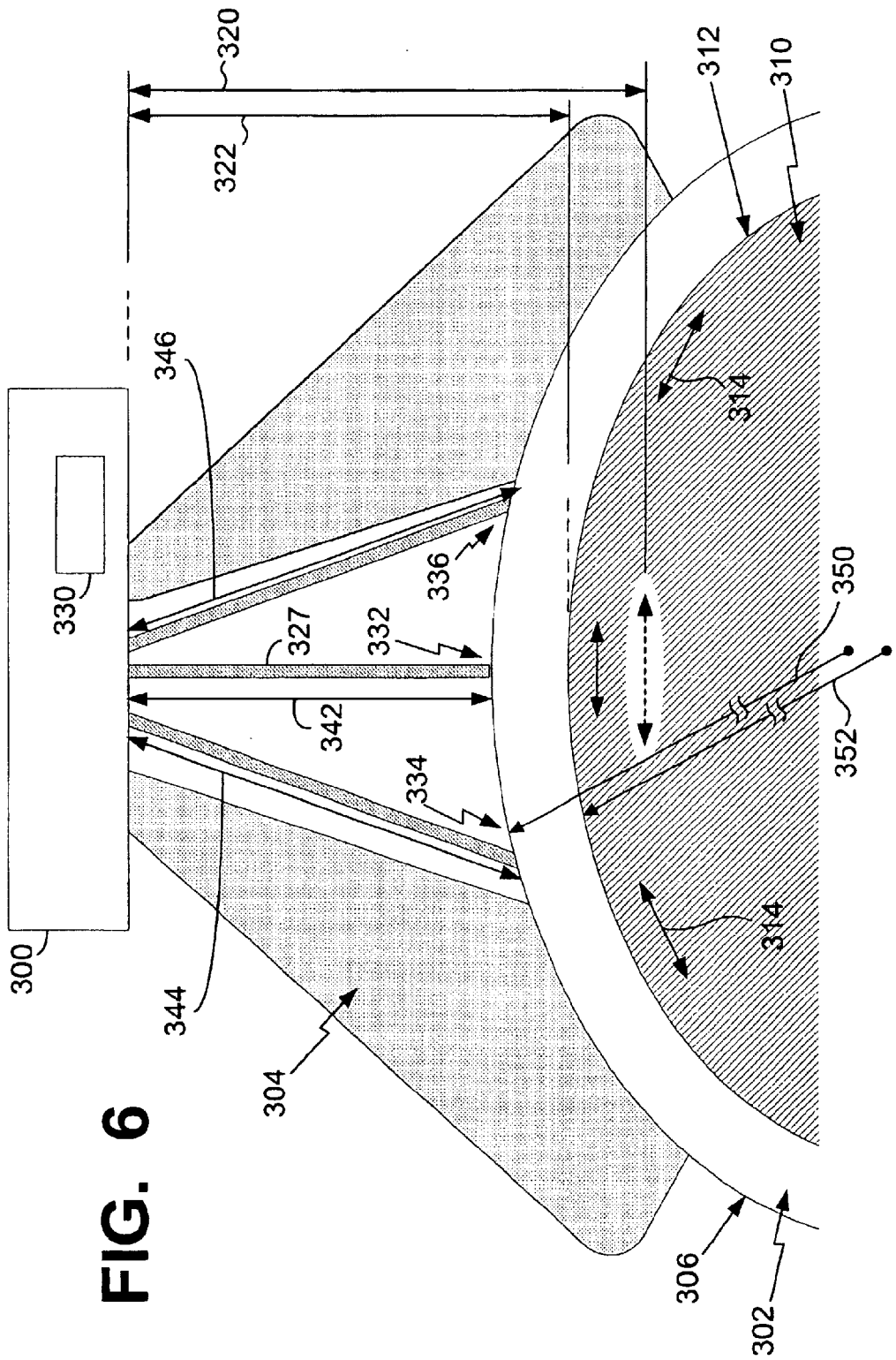
FIG. 6 depicts a simplified block diagram of a non-contact thickness measurement apparatus according to the variation of FIG. 4.

FIG. 6 depicts a simplified block diagram of a non-contact thickness measurement apparatus 300 according to one embodiment of the present invention for measuring a thickness of a layer 302 (e.g., a layer of wet paint) without contacting the surface. The apparatus can measure the thickness of the layer regardless of whether the layer surface 306 and/or substrate surface 312 is flat or curved.

The apparatus 300 generates an eddy current field 304 that is directed towards the layer 302 and electrically conductive substrate 310. Due to the effects of the eddy current field 304 on a curved substrate surface 312, the induced eddy current 314 results around the curve. As such, the eddy current occurs along the curved surface at a plurality of different distances from the apparatus 300.

In measuring the distance between the apparatus 300 and the substrate surface 312, a precise distance is difficult to achieve due to the varying distances. As such, a resulting average value is measured 320 between the variations in distance due to the surface curve. Thus, the measured distance 320 between the apparatus and the substrate surface 312 is actually below the actual substrate surface 312 (for example, one skin depth, or other depths depending on the curvature of the substrate surface 312 and/or the material of the substrate, e.g., 3 mils for an aluminum substrate or other material that is at least semi-conductive) for a convex substrate, or above the surface for a concave substrate.

However, the present invention compensates for this below surface measurement or above surface measurement. A signal processor 330 of the apparatus 300 is configured to determine a radial characteristic or aspect of the portion of the substrate surface 312 being measured. Utilizing this radial characteristic, the present invention is capable of determining a scaling factor. The actual distance 322 between the apparatus and the substrate surface 312 is determined by scaling the measured distance 320 according to the scaling factor.

In one embodiment, the present invention determines the radial characteristic of the section of the substrate surface being measured by determining a distance between the apparatus 300 and the layer surface 306 at a plurality of points along the portion of the surface being measured. For example, the apparatus 300 is positioned at a first distance from the surface, for example, at a distance of approximately 5 to 6 inches. The apparatus activates a laser 327 to be directed to impinge on the layer surface 306 and sweeps the laser across the surface. Measurements are taken at a plurality of locations along the swept path. For example three measurements can be taken at a first position 332, a second position 334 and a third position 336 (e.g., +10°, 0° and −10°; +30°, 0° and −30°; or other similar distributions). In each position, a distance 342, 344 and 346 can be measured between the apparatus and the layer surface 306.

The pluralities of distances define points along the arc of the layer surface 306. Once pluralities of distances are determined, a circular arc is estimated using one or more arc or circle algorithms (which are known in the art) and the signal processor 330 determines a radius 350 of the curvature of the circular arc of the layer surface 306. The signal processor 330 equates the calculated radius of curvature 350 to the radius of curvature 352 of the substrate surface 312 for the portion of the layer being measured. The processor further compares the measured distances 342, 344, 346 to determine if the curve is convex or concave to adjust the scaling factor accordingly.

Having a substrate radius of curvature 352, the signal processor 330 can determine a scaling factor, which in some embodiments is linearly related to the radial characteristics 352 of the portion being measured. With the scaling factor, the signal processor can scale the measured distance 320 between the apparatus 300 and the average eddy current 314 to determine the actual distance 322 between the apparatus and the substrate surface 312.

Figure 7:
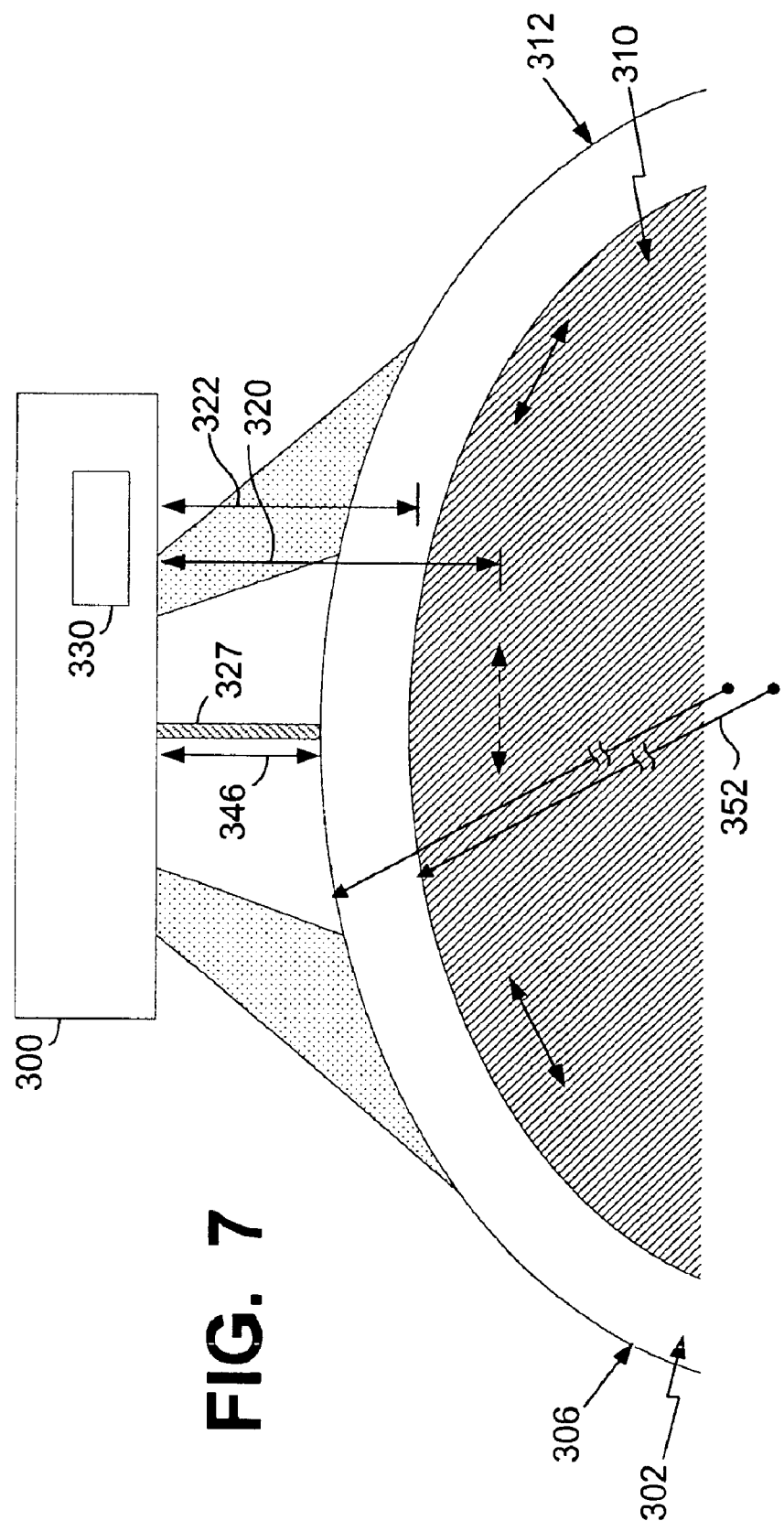
FIG. 7 depicts a simplified block diagram of the measurement apparatus of FIG. 6 positioned a second distance above a curved surface.

Once the curvature and/or radius of curvature is known, the apparatus can be moved closer to the surface 306 to increase the effects of the eddy current field 304. For example, the apparatus can be moved to approximately 1 inch from the surface 306. FIG. 7 depicts a simplified block diagram of the measurement apparatus 300 shown in FIG. 6 positioned a second distance above a curved surface 306. Preferably, the apparatus is maintained at substantially the same lateral positioning over the arc used when measuring the curvature of the surface and in a position approximately normal to the surface 306. In one embodiment, as the apparatus is moved closer, the processor compensates the measurement and scaling factors accordingly.

Figure 8:
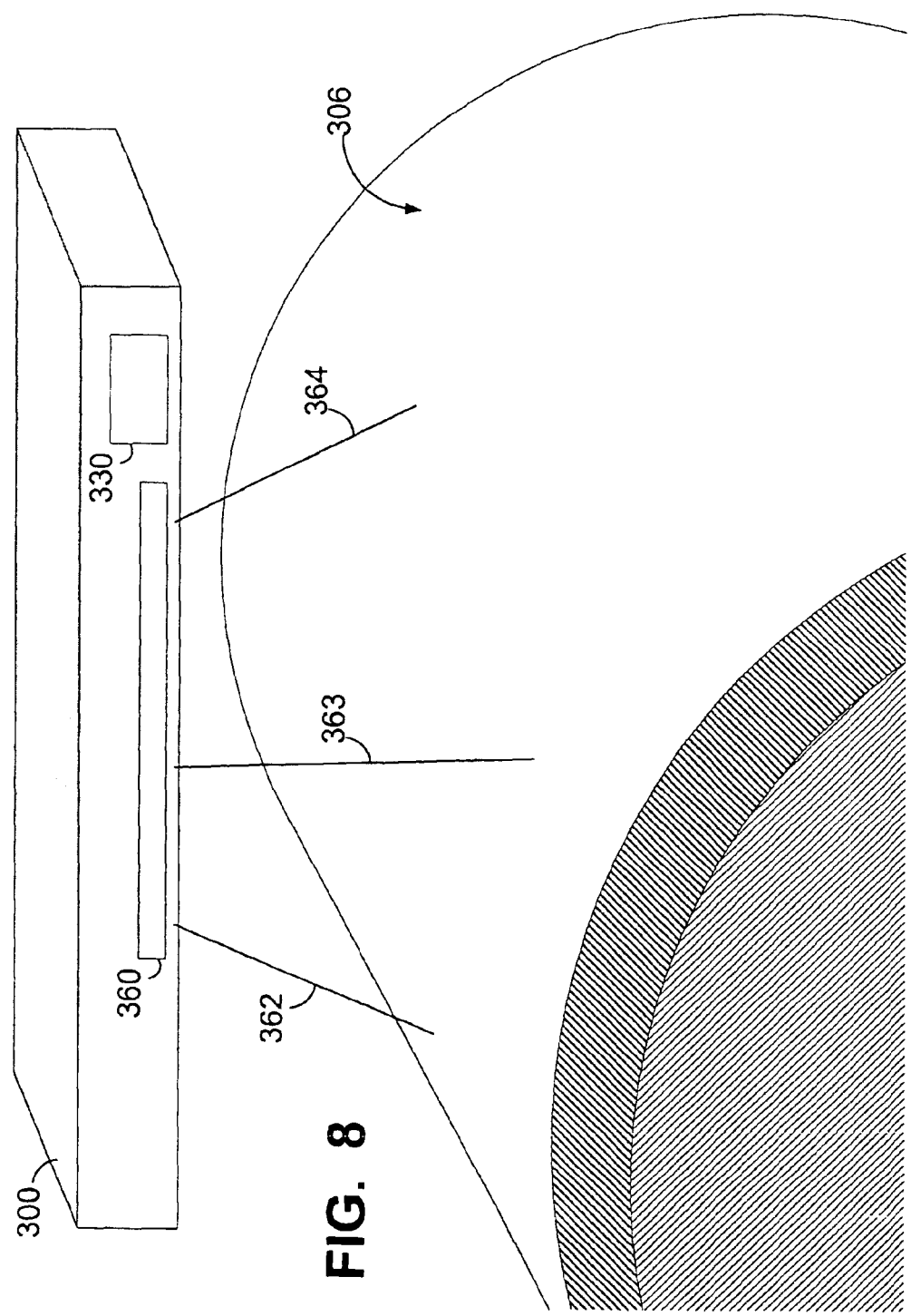
FIG. 8 depicts a simplified block diagram of a measurement apparatus according to the variation of the apparatus of FIG. 4 positioned above a curved surface employing a non-contact tripod for maintaining proximity with the curved surface.

In one embodiment, the apparatus 300 includes a non-contact tripod apparatus to aid in maintaining the positioning of the apparatus. FIG. 8 depicts a simplified block diagram of the apparatus 300 positioned above a curved surface 306. The apparatus employs the non-contact tripod 360 to maintain positioning over the surface as well as to maintain the apparatus at an angle to the surface 306 that is generally normal to the surface. The present invention provides accurate layer thickness measurements even if the apparatus deviates from normal. However, maintaining the apparatus normal to the surface 306 is the preferred operation. For example, the angle of incident to the surface 306 can be +/−15° from normal while still achieving accurate measurement results, preferably within +/−10° from normal.

In one embodiment, the tripod 360 employs three tripod lasers 362–364 that are directed towards the surface 306. The processor 330 is capable of determining an angle to the surface based on the measured reflection of each of the lasers 362–364 from the surface. The angle is displayed, reported or supplied to an operator in some similar manner, allowing the operator to make adjustments to maintain the angle at normal.

Referring back to FIG. 7, once the arc and radius of the arc 352 are determined, the apparatus can be shifted closer to the surface to increase the eddy current field effects. The apparatus can then measure the average distance 320 to the eddy current within the substrate 310. The processor 330 utilizes the radius of curvature 352, determined as described above, to scale the measured distance 320 at the new position to obtain an actual distance 322 to the substrate surface 312. The apparatus further generates a laser beam 327, preferably substantially normal to the layer surface 306. The apparatus measures the distance 346 to the layer surface 306. Knowing the distance 346 to the layer surface 306 and the scaled, actual distance 322 to the substrate surface 312, the processor calculates the layer thickness 328. Thus, the present invention can accurately determine a thickness of the layer 302 on a substrate surface 312 having substantially any curvature.

In one embodiment, the apparatus is tuned to optimize the measurements based on the layer and/or substrate being measured. When measurements are taken, a tuning procedure can be initiated, for example by an operator. The apparatus can alternatively initiate tuning before each measurement. Additionally and/or alternatively, the apparatus can perform tuning and the operator can set the tuning results as the tuning parameters for a series of measurements (e.g., for a plurality of measurements of a single object or component being measured).

Initial tuning can be performed to determine any number of characteristics that can affect the precision of measurement, such as reflective properties of the layer, material of the layer, material of the substrate, conductivity of the substrate and other similar characteristics. In one embodiment, tuning of the one or more light or laser sources and detectors can be performed by directing a light or laser onto the layer, whether wet or dry, and a sensor can determine a color of the layer, light absorption characteristics and other reflective characteristics. Tuning parameters can also be directly provided to the apparatus through an external source to compensate for color, type of material, and other parameters affecting reflective characteristics of the layer and conductive characteristics of the substrate.

In one embodiment, the processor employs a layer tuning procedure or program. The measured or sensed data determined by the apparatus as well as data externally supplied are utilized by the tuning procedure to calculate tuning characteristics. The processor 330 can then utilize the tuning characteristics to aid in analyzing further measurements as well as dictating how measurements are to be taken.

For example, a light source or laser source at a first predefined wavelength may be utilized based on some tuning characteristics to optimize measurement results, where a light source or laser at a different wavelength may alternatively or additionally be utilized for measurements based on other tuning characteristics. Similarly, light intensity can also be controlled as well as other similar parameters to optimize the measurements taken by the apparatus.

Further, in some embodiments, the present invention provides tuning for the eddy current field generator(s) and/or eddy current sensor(s). This allows the eddy current generator and sensor to be adjusted according to the substrate material. For example, the eddy current can be configured to implement a first set of criteria for a first substrate material that is 99% pure (e.g., 99% pure aluminum), and to implement a second set of criteria for a second substrate that is a 93% pure (e.g., 93% pure aluminum). The criteria can include frequency, intensity and other similar criteria to optimize the induction and detection of eddy currents in the substrate.

In one embodiment, the measurement apparatus 300 of the present invention utilizes software for tuning and/or calibrating the apparatus. The apparatus can be positioned proximate a layer surface to be measured. Tuning can be initiated by a controller or an operator (e.g., an operator can push a "tuning" button). The tuning process can include taking measurements and/or utilizing externally supplied and/or stored data. The software can tune the apparatus, zeroing the device for the specific layer (e.g., paint, foam, insulating materials, fire retardant materials and other similar layers) and/or substrate. The apparatus can then take measurements for determining a thickness of the layer.

The tuning of the apparatus can be implemented for each measurement taken. Alternatively, the tuning can be initiated once for each surface/layer combination. Further, the apparatus can accumulate tuning data from earlier tuning determinations and one of the tuning settings based on previous tuning measurements can be employed based on operator input and/or initial measurements.

Figure 9:
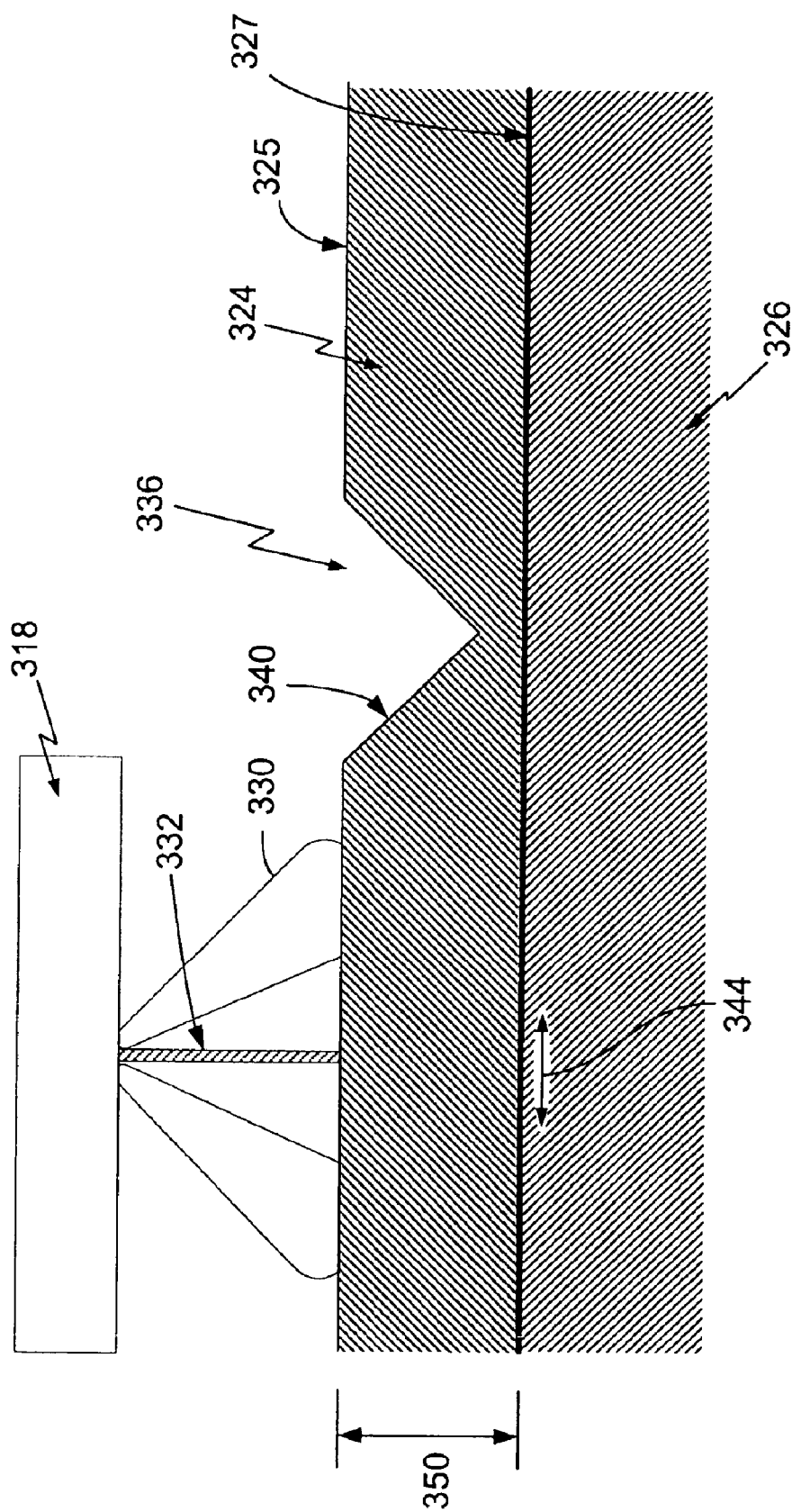
FIGS. 9 and 10 depict a measurement apparatus according to the variation of the apparatus of FIG. 4 generating an eddy current field and one or more laser beams to impinge on a layer surface over or near a recess in the layer.
Figure 10:
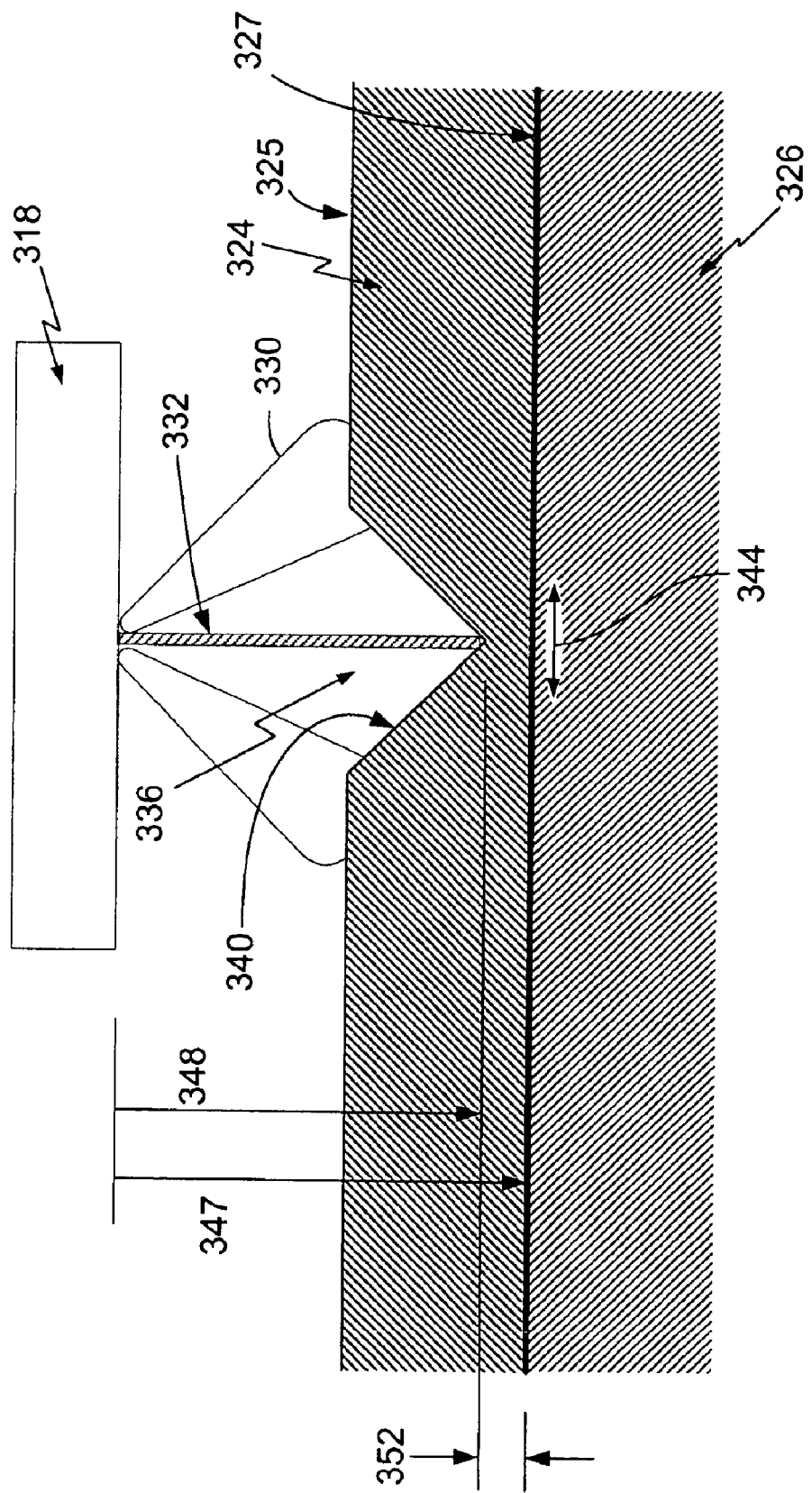

As described above, the present apparatus, system and method can additionally measure changes or variations in a surface, such as scratches, holes, grooves, changes in thickness and other such surface changes. FIGS. 9 and 10 depict a simplified cross-sectional block diagram of a layer 324 fixed to a substrate 326. The layer surface 325 includes a recess 336, such as a groove, scratch or other variation in the layer.

The present measurement apparatus can measure the depth of the recess 336 by determining a difference in layer thickness between the thickness at the recess versus the thickness surrounding the recess. As shown in FIG. 9, a measurement apparatus 318 generates an eddy current field 330 and one or more laser beams 332 to impinge on the layer surface 325 at a location near the recess 336. An eddy current 344 is generated in the conductive substrate 326 allowing the measurement apparatus to determine a distance to the substrate surface 327. The laser 332 reflects off of the layer surface 325 to allow the measurement apparatus to determine a distance to the layer surface. As discussed above, knowing the distances to the substrate surface 327 and the layer surface 325, the present measurement apparatus is then capable of determining a layer thickness 350 of the layer near the recess 336 without contacting the layer surface.

Referring to FIG. 10, the measurement apparatus 318 can then be shifted over the recess 336. Again the eddy current field 330 induces an eddy current 344 in the substrate 326 and the measurement apparatus determines the distance 347 to the substrate surface 327. The measurement apparatus further generates the one or more lasers 332 that reflect from the recess surface 340 allowing the measurement apparatus to determine a distance 348 to the recess surface. The measurement apparatus can then determine a thickness of the layer 352 at the recess. The apparatus then utilizes the measured thickness 350 (see FIG. 9) of the layer adjacent the recess and the measured thickness 352 of the layer at the recess, and determines the depth of the recess by taking the difference between the thicknesses 350, 352.

The present invention can be implemented to determine the landscape of a layer or film surface. The measurement apparatus can be moved across the surface allowing the apparatus to continue to make several measurements across the surface. With the several measurements a layer surface can be reconfigured with the data. As the measuring apparatus (not shown) is moved in a direction along the surface, the apparatus can generate the eddy current field and one or more lasers to measure a plurality of thickness measurements.

The present invention can then generate an image of the layer surface. In one embodiment, the apparatus or an external processor/computer generates a graphical image of the surface providing precise thickness data for the layer 324.

The measurement apparatus can be implemented in a controlled machine that is controlled to position the measurement apparatus at a position proximate the layer to be measured. Alternatively, the apparatus is implemented through a handheld device allowing a single operator to hold the apparatus and make accurate measurements.

FIG. 11 depicts a simplified block diagram of a handheld measurement apparatus 420 according to one embodiment of the present invention. The apparatus includes a controller 422 for controlling an eddy current device 424, a laser source/detector 426 and a proximity detector 430. As described above, the proximity detector determines a proximity and angle of alignment with the surface 452 of a layer or film 450 being measured. The eddy current device 424 generates the electromagnetic field 425 to induce an eddy current in a substrate 454, and an eddy current detector for detecting and determining a distance to the induced eddy current. The laser device 426 generates and detects a laser 427 that reflects from the surface 452.

The controller 422 further receives the measurements obtained from the eddy current device 424, laser device 426 and proximity device. If the surface 452 is curved, the apparatus controls the laser device 426 and eddy current device 424 to measure the arc, allowing the controller to determine and apply the scaling factor. The controller utilizes the measured data to display data on an apparatus display 432 to allow the operator to verify positioning and/or layer thickness. The controller can additionally couple with a data storage unit 434 that can store measured data, tuning data, software and other data utilized by the apparatus 420. In some embodiments, the apparatus 420 additionally includes an external connector 436 allowing the apparatus to couple with an external processor 440, such as a computer, controller or other processing device. The apparatus can additionally include a power source 442. The power source can be a battery or other portable power source, or a coupling to an external power source.

The apparatus 420 additionally includes one or more activation buttons, switches or triggers 444 to initiate operation, tuning and/or measurements. The components of the apparatus are housed in a housing 446, preferably a durable housing to protect the components from environmental conditions and impact damage. For example, when implemented to measure the thickness of paint, the housing provides protection against paint particles and other potentially damaging particles.

Providing a portable device allows an operator to quickly and easily measure layer thickness over a wide area. For example, an operator can quickly make several different measurements over several different parts of an aircraft to ensure that paint (corrosion resistant layer(s), insulation and other films or layers) is applied uniformly and/or to a desired thickness without having to contact the surface of the paint. Further, the thickness of the paint can be determined while the paint is still wet. As such, a top coat of paint or other coating can be applied while the primer coat or other coat is still wet, significantly reducing the wait time and the expense of the wait time. Still further, the thickness of the paint can be precisely controlled to ensure accurate and adequate paint coverage, yet maintaining the amount of applied paint to a minimum reducing overall weight of an aircraft as well as reducing costs.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for use in measuring a thickness of a layer, comprising:
    a light source configured to generate a light beam;
    a light beam detector configured to detect at least a portion of the light beam reflected;
    an eddy current field generator configured to induce an eddy current;
    an eddy current detector configured to detect the induced eddy current;
    a processor coupled with the light source, the light detector, the eddy current field generator and the eddy current detector, wherein the processor is configured to control the light detector, the eddy current field generator and the eddy current detector;
    the light source is further configured to sweep the light beam across a first surface;
    the light beam detector detects the portion of the light beam reflected from the first surface as the beam is swept across the first surface; and
    the processor is configured to determine a radial characteristic of the portion of a first surface over which the light beam is swept, determine a scaling factor based on the radial characteristic that is applied to a first distance relative to the detected eddy current to determine a scaled first distance, and to determine a thickness based on a second distance relative to the first surface and the scaled first distance.

2. The apparatus as claimed in claim 1, further comprising:
    a light source device including the light source and the light beam detector, wherein the light source generates the light beam to be reflected from the first surface of a layer, the light beam detector detects the at least a portion of the light beam reflected from the first surface of the layer, and the light source device is configured to determine the second distance to the first surface without contacting the first surface;
    an eddy current field device including the eddy current field generator and the eddy current detector, wherein the eddy current field generator is configured to generate an electromagnetic field, the eddy current detector is configured to detect the induced eddy current in a substrate, and the eddy current field device is configured to determine the first distance to the induced eddy current without contacting the first surface or a surface of the substrate; and
    the processor being coupled with the light source device and the eddy current field device, wherein the processor is configured to determine the thickness that is a thickness of the layer based on the first and second distances.

3. The apparatus as claimed in claim 1, wherein the light source generates the light beam to be reflected from the first surface of a layer, the light beam detector detects the at least a portion of the light beam reflected from the first surface of the layer;
    the eddy current field generator induces the eddy current in a substrate, the eddy current detector is configured to detect the induced eddy current in the substrate; and
    the processor is further configured to determine the second distance to the first surface based on the portion of the detected light beam, to determine the first distance to the induced eddy current, and to determine the thickness that is a thickness of the layer based on the first and second distances without contacting the first surface or a substrate surface.

4. The apparatus as claimed in claim 1, further comprising:
    a proximity sensor configure to detect a proximity to the first surface.

5. The apparatus as claimed in claim 4, wherein the proximity sensor is a non-contact tripod proximity sensor.

6. The apparatus as claimed in claim 1, wherein the light source is configured to scan a portion of the first surface and determine a plurality of distributed distances across the scanned portion; and
    wherein the processor utilizes the plurality of distributed distances to determine the scaling factor.

7. A method used for measuring a thickness of a film, comprising:
   inducing an eddy current in a substrate;
   detecting the induced eddy current;
   determining a first distance based on the eddy current;
   transmitting a light beam to impinge on a surface of a layer;
   detecting at least a portion of the light beam reflected from the layer;
   determining a second distance to the surface of the layer;
   determining a first thickness of the layer based on the second distance to the surface and the first distance to the induced eddy current;
   wherein the step of determining the second distance to the surface of the layer includes determining the second distance to a first portion of the surface of the layer;
   detecting at least a portion of the light beam reflected from a second portion of the surface of the layer;
   determining a third distance to the layer;
   determining a second thickness of the layer based on the third distance; and
   processing the first and second thickness and determining a change in thickness between the first and second portions of the layer.

8. The method as claimed in claim 7, wherein the steps of inducing, detecting the induced eddy current, determining a first distance, transmitting, detecting at least a portion of the light beam, determining a second distance, and determining a first thickness are performed without contacting the layer or the substrate.

9. The method as claimed in claim 7, further comprising:
   calculating an arc of the surface of the layer;
   generating a scaling factor; and
   applying the scaling factor to the first distance to the eddy current, such that determining the first thickness of the layer is based on the second distance to the surface of the layer and the scaled first distance to the induced eddy current.

10. The method as claimed in claim 7, further comprising:
    maintaining an alignment with the surface of the layer.

11. The method as claimed in claim 10, further comprising:
    generating a plurality of proximity light beams;
    detecting at least a portion of each of the plurality of proximity light beams reflecting from the surface;
    determining a proximity to the surface; and
    maintaining a position normal to the surface during the steps of determining the first distance and determining the second distance.

12. The method as claimed in claim 7, further comprising:
    implementing a first tuning optimizing the induction of the eddy current; and
    implementing a second tuning optimizing the generating of the light beam and the detecting of the at least the portion of the reflected light beam.

13. A method used for measuring a thickness of a film, comprising:
    inducing an eddy current in a substrate;
    detecting the induced eddy current;
    determining a first distance based on the eddy current;
    transmitting a light beam to impinge on a surface of a layer;
    detecting at least a portion of the light beam reflected from the layer;
    determining a second distance to the surface of the layer;
    determining a first thickness of the layer based on the second distance to the surface and the first distance to the induced eddy current;
    determining a radial characteristic of a region of the surface;
    determining a scaling factor based on the radial characteristic;
    scaling the first distance based on the scaling factor; and
    the step of determining a first thickness includes determining the first thickness of the layer based on the second distance and the scaled first distance.

14. The method as claimed in claim 13, further comprising:
    sweeping the light beam over the region of the surface of the layer;
    determining a plurality of additional distances to the layer in the region of the surface; and
    wherein the step of determining a radial characteristic includes determining an arc of the region based on the plurality of additional distances.

15. An apparatus for use in measuring a thickness, comprising:
    means for inducing an eddy current;
    means for detecting the induced eddy current;
    means for determining a first distance to the induced eddy current;
    means for generating a laser;
    means for detecting at least a portion of the laser reflected from a surface of a layer;
    means for determining a second distance to the surface without contacting the surface;
    means for determining a first thickness of the layer utilizing the first distance and the second distance;
    the means for determining a second distance comprises means for determining the second distance to a first portion of the surface of the layer;
    means for detecting at least a portion of the laser reflected from a second portion of the surface of the layer;
    means for determining a third distance to the layer based on the detected portion of the laser reflected from the second portion of the layer;
    means for determining a second thickness of the layer based on the third distances; and
    means for determining a change in thickness between the first and second portions of the layer.

16. The apparatus as claimed in claim 15, further comprising:
    means for maintaining a proximity over the surface of the layer.

17. The apparatus as claimed in claim 15, further comprising:
    means for determining an arc of the first surface;
    means for determining a scaling factor based on the arc of the first surface; and
    the means for determining a thickness being further configured to scale the first distance based on the scaling factor.

* * * * *

UNITED STATES PATENT AND TRADEMARK OFFICE
CERTIFICATE OF CORRECTION

| | | |
|---|---|---|
| PATENT NO. | : 6,961,133 B2 | Page 1 of 1 |
| APPLICATION NO. | : 10/652353 | |
| DATED | : November 1, 2005 | |
| INVENTOR(S) | : Caton et al. | |

It is certified that error appears in the above-identified patent and that said Letters Patent is hereby corrected as shown below:

In the CLAIMS:

Claim 4, column 12, line 58, change "configure" to --configured --.

Claim 15, column 14, line 48, change "distances" to --distance--.

Signed and Sealed this

First Day of August, 2006

JON W. DUDAS
*Director of the United States Patent and Trademark Office*